United States Patent
Hao et al.

(10) Patent No.: US 7,221,474 B2
(45) Date of Patent: May 22, 2007

(54) METHOD FOR VISUALIZING LARGE VOLUMES OF MULTIPLE-ATTRIBUTE DATA WITHOUT AGGREGATION USING A PIXEL BAR CHART

(75) Inventors: Ming C. Hao, Palo Alto, CA (US); Julian Ladisch, Halle (DE); Umeshwar Dayal, Saratoga, CA (US); Meichun Hsu, Los Altos Hills, CA (US); Daniel Keim, Morris Plains, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1126 days.

(21) Appl. No.: 09/917,393

(22) Filed: Jul. 27, 2001

(65) Prior Publication Data

US 2004/0205450 A1  Oct. 14, 2004

(51) Int. Cl.
*G06K 15/00* (2006.01)
(52) U.S. Cl. .................. 358/1.18; 358/2.1; 358/1.9
(58) Field of Classification Search ................ 358/1.9, 358/403, 462, 530, 537, 443, 2.1, 1.18; 707/200, 707/7; 711/2, 6, 202, 207, 212, 218, 211
See application file for complete search history.

(56) References Cited

U.S. PATENT DOCUMENTS 6,748,496 B1 * 6/2004 Scarpino ................ 711/137
6,762,791 B1 * 7/2004 Schuetzle ................ 348/231.3
6,819,441 B2 * 11/2004 Umebayashi ............. 358/1.15
2001/0027791 A1 * 10/2001 Wallace et al. ........ 128/204.21
2002/0111791 A1 * 8/2002 Candelore ..................... 704/7
2003/0004971 A1 * 1/2003 Gong et al. ................ 707/200

* cited by examiner

*Primary Examiner*—Jerome Grant

(57) ABSTRACT

A method for graphically presenting large volumes of data without aggregation using a pixel bar chart. Records having multiple attributes are sorted for constructing a graphically displayable array, wherein the graphically displayable array comprises a plurality of pixels. Each pixel represents one record. The non-aggregation data visualization technique of the present invention provides solutions to meet the need of automatic data preparation for the visual data mining of massive data volumes. The present invention effectively uses screen space to represent each record without cluttering the display, allowing a user to easily discover patterns and correlations. The present invention provides a visual impression by representing the value of a record by a color and representing the number of records by the area of a group. With "drill down" capability, a user can navigate through each record to find detail information. Each record is represented by one pixel, allowing millions of records to be displayed at the same time. Each individual record can be accessed interactively, by allowing direct access to the detail data by picking at single pixels.

30 Claims, 10 Drawing Sheets
(3 of 10 Drawing Sheet(s) Filed in Color)

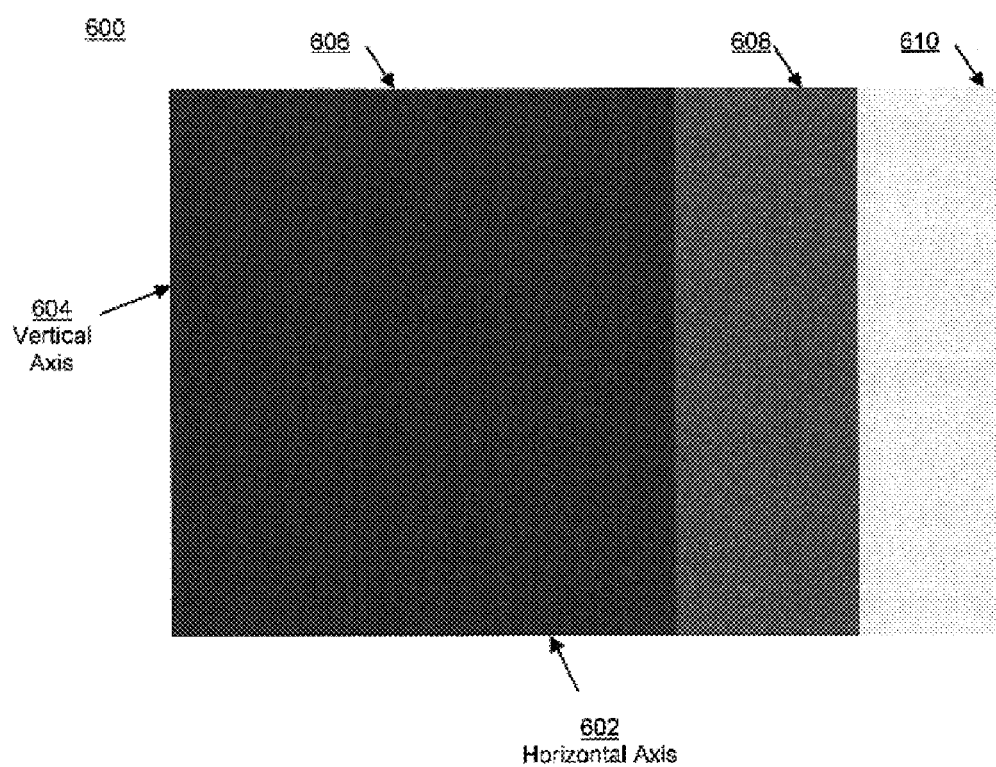

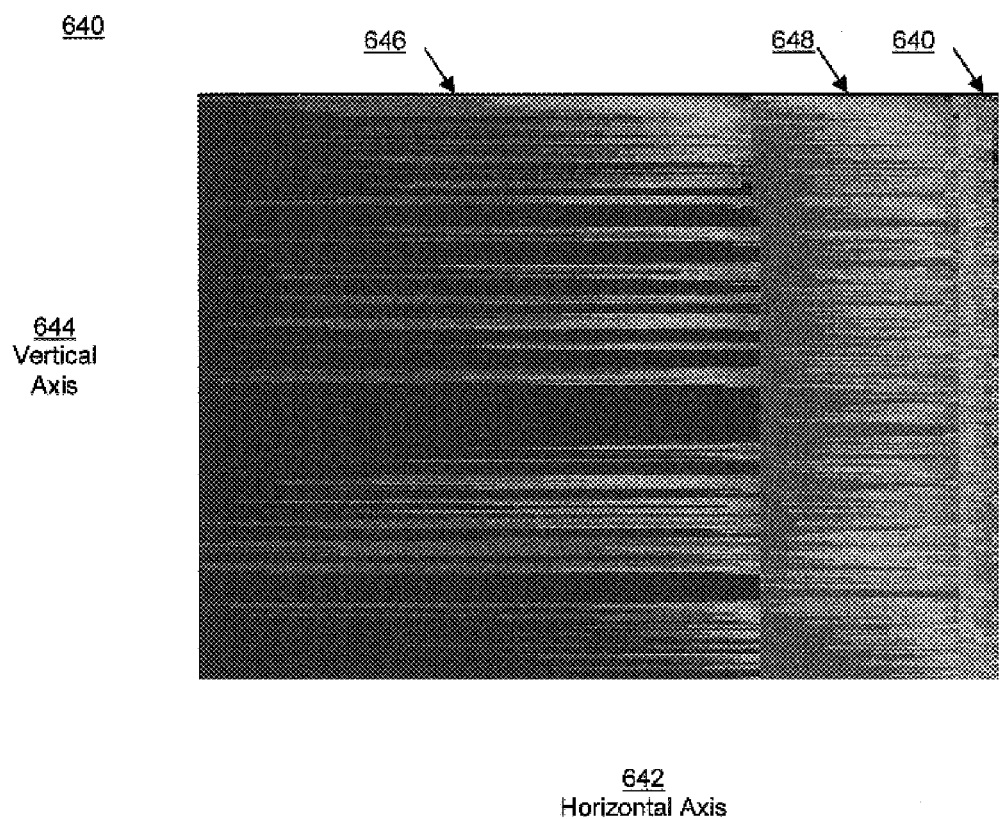

METHOD FOR VISUALIZING LARGE VOLUMES OF MULTIPLE-ATTRIBUTE DATA WITHOUT AGGREGATION USING A PIXEL BAR CHART

FIELD OF INVENTION

The present invention relates to the field of data visualization. Specifically, the present invention relates to a method for visualizing large volumes of data having multiple attributes without aggregation.

BACKGROUND OF THE INVENTION

Modern organizations and corporations often rely on computer systems to manage the massive amounts of data acquired in the course of running their operations. Interpreting large volumes of data often presents great challenges to those responsible for understanding the data. A common method for visualizing large volumes of data is to use a bar chart. A bar chart is a type of graph in which different values are represented by rectangular bars.

In a typical bar chart, each bar represents a single data value. It is common to represent aggregated data using two-dimensional or three-dimensional bar charts. When using a bar chart, the number of data items shown at the same time must be pre-decided. Additionally, the bar chart can only show a small range of data items (10–20), because showing too many items will obscure the data. Furthermore, if a three-dimensional bar chart is used, some bars hide others and overlapping makes the visual impression misleading, as the area seen is not proportional to the value to be represented. In these cases, valuable information often gets lost.

FIG. 1 illustrates a three-dimensional bar chart 100 of over 600,000 customer orders and corresponding purchase analysis. To allow for viewing, all data is aggregated by order 110, price 120 and quantity 130. No individual customer information is shown, only the aggregate total of customer information. The display is difficult to understand, due to some data (e.g., column 140) being disproportionately larger than other columns, making it difficult to understand the values of the smaller columns. Furthermore, some columns (e.g., column 140) hide other columns, making that data extremely difficult, if at all possible, to understand.

Another common method used to visualize large volumes of data is a stack chart 200 as shown in FIG. 2. A stack chart is similar to a bar chart, but also allows for the area of a color to be proportional to the value of a particular set of data.

Stack chart 200 illustrates an exemplary stack chart illustrating sources of energy in the United States by year. The area of each color is proportional to the amount of energy provided by the respective source in that year. Each year is a group. Only five groups are shown in FIG. 2. Limiting the number of groups to five allows for easy viewing of the data for the selected years, but severely limits the amount of data displayed. It may be desirable to view more data than just the five years displayed. Increasing the number of groups, for example by showing all 372 months from 1950 until 1980, results in an overwhelming amount of data that is difficult to understand and interpret. If stack chart 200 were displayed on a standard computer system display of 1024×768 pixels, the groups would have a width of three pixels. These narrow groups do not allow the showing of small width variations accurately like those from 1970 until 1980 (e.g., 2.4, 3.1, 2.7) in stack chart 200. In addition, at least 25% of the screen space is wasted for gaps between the groups, even if only one pixel is used as a gap.

Due to constraints dictated by the viewing limits of human eye, both bar charts and stack charts are required to reduce the number of values shown as the number of records increases. Otherwise, the chart obscures the nature of the data, as the chart will contain too much data in too small a space for a human reader to process and understand. The number of values can be reduced by limiting the number of groups showing or by aggregating data. Both selection and aggregation reduce the information seen, limiting access to more detailed data.

Accordingly, a need exists for a method for visualizing large volumes of data having multiple attributes without requiring aggregation of the data. A need also exists for a method that accomplishes the above need and allows for a better way to compare records and to identify trends and patterns in data. Additionally, a need exists for a method that accomplishes the above needs and allows for direct access to the detail data by drilling down at single data items. Furthermore, a need exists that accomplishes the above needs and is easily understood by a user.

SUMMARY OF THE INVENTION

The present invention provides a method for visualizing large volumes of data having multiple attributes without requiring aggregation of the data. A method for graphically presenting and visually mining large volumes of data using a graphically displayable array is presented. In one embodiment, the graphically displayable array is a pixel array. Data comprising a plurality of records is received, wherein each record has multiple attributes. A first attribute, second attribute and third attribute are selected from the plurality of records. In one embodiment, the visual indicator is a color selected from a range of colors. In one embodiment, the third attribute is the same attribute as the first attribute. In another embodiment, the third attribute is the same attribute as the second attribute. In one embodiment, the attributes selected to construct a graphically displayable array are predetermined. In another embodiment, a user selects the attributes. The plurality of records are arranged to construct a graphically displayable array, wherein the graphically displayable array comprises a plurality of pixels or data points. Each of pixel or data point represents one record of the plurality of records wherein the first attribute corresponds to a first axis, the second attribute corresponds to a second axis, and the third attribute corresponds to a visual indicator.

BRIEF DESCRIPTION OF THE DRAWINGS

The application file contains at least one drawing executed in color. Copies of this patent application publication with color drawings will be provided by the Office upon request and payment of the necessary fee.

The accompanying drawings, which are incorporated in and form a part of this specification, illustrate embodiments of the invention and, together with the description, serve to explain the principles of the invention:

FIG. 6a illustrates a graphically displayable array wherein the third attribute (associated with color) is the same as the first attribute (associated with the horizontal axis) in accordance with an embodiment of the present invention.

FIG. 6c illustrates a graphically displayable array wherein the third attribute (associated with color) is different than both the first attribute (associated with the horizontal axis) and the second attribute (associated with the vertical axis) in accordance with an embodiment of the present invention.

DETAILED DESCRIPTION

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "sorting", "constructing", "interacting", "placing" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Figure 1:
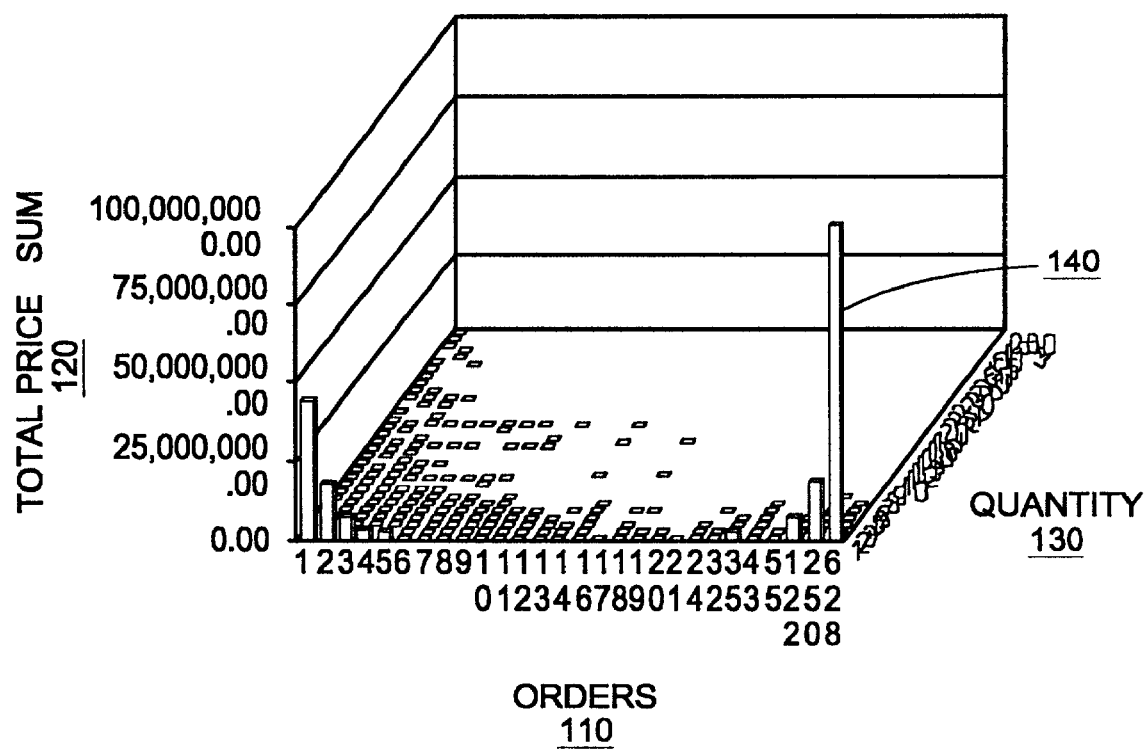
FIG. 1 illustrates a three-dimensional bar chart in accordance with the prior art.
Figure 2:
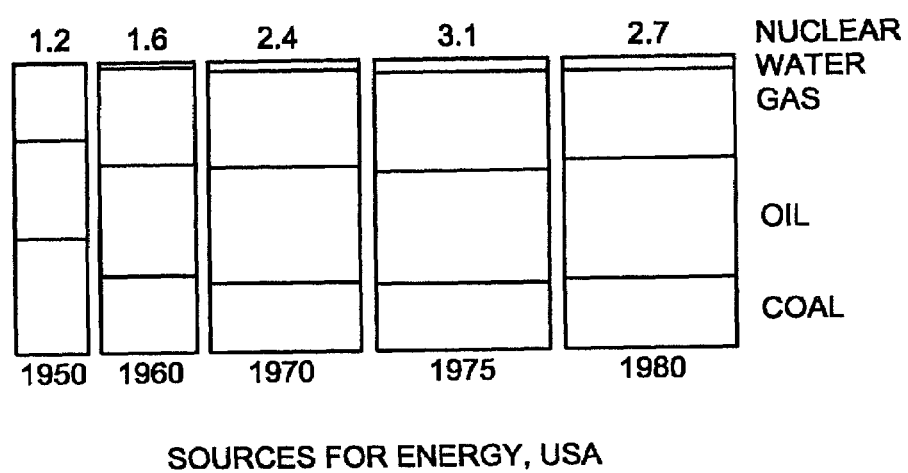
FIG. 2 illustrates a stack chart in accordance with the prior art.
Figure 3:
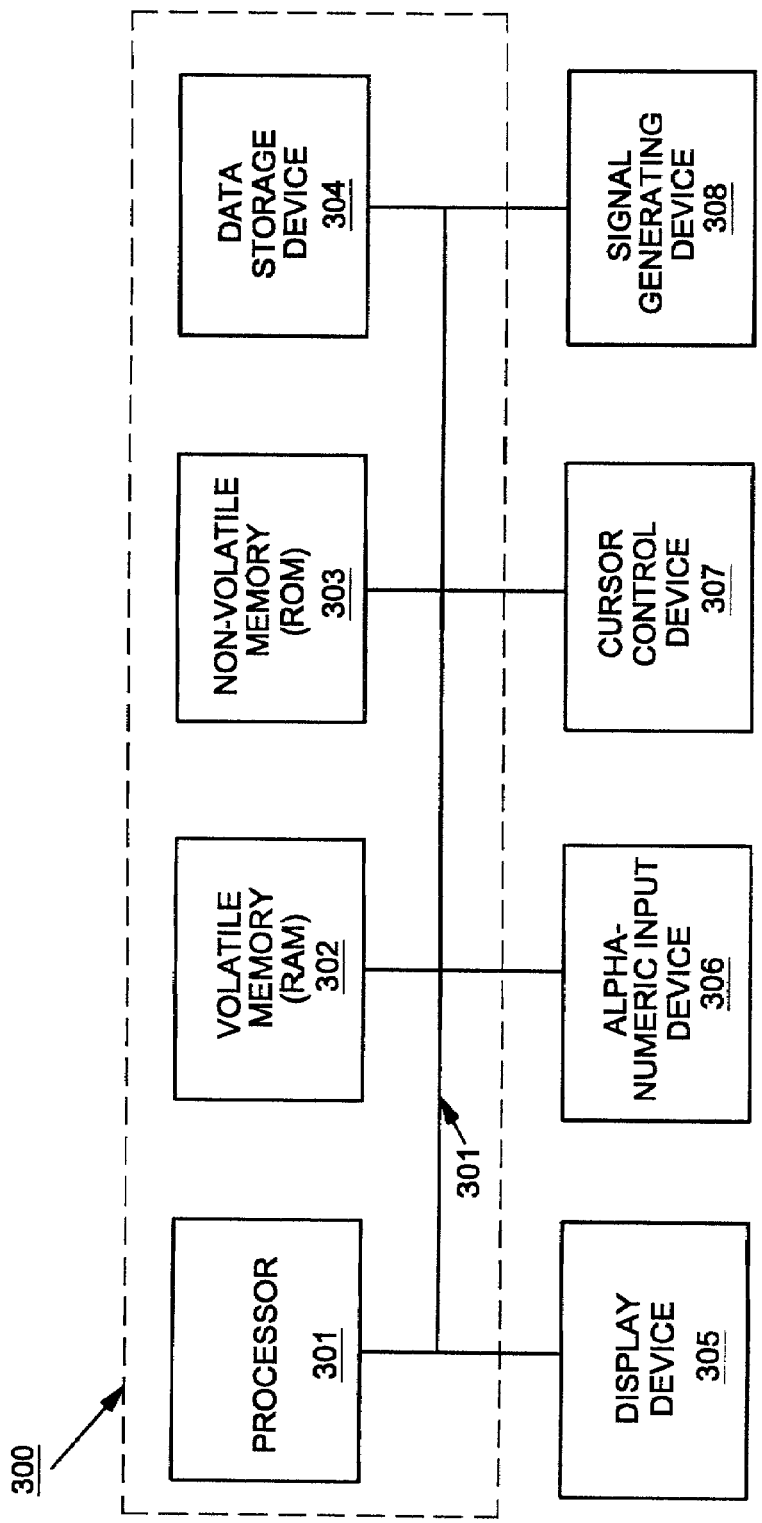
FIG. 3 illustrates an exemplary computer system on which embodiments of the present invention may be practiced.

With reference to FIG. 3, portions of the present invention are comprised of computer-readable and computer executable instructions which reside, for example, in computer-usable media of a computer system. FIG. 3 illustrates an exemplary computer system 300 on which embodiments (e.g., process 500 of FIG. 5 and process 600 of FIG. 6) of the present invention may be practiced. It is appreciated that computer system 300 of FIG. 3 is exemplary only and that the present invention can operate within a number of different computer systems including general purpose computer systems, embedded computer systems, and stand alone computer systems specially adapted for controlling automatic test equipment.

Computer system 300 includes an address/data bus 310 for communicating information, a central processor 301 coupled with bus 310 for processing information and instructions, a volatile memory 302 (e.g., random access memory RAM) coupled with the bus 310 for storing information and instructions for the central processor 301 and a non-volatile memory 303 (e.g., read only memory ROM) coupled with the bus 310 for storing static information and instructions for the processor 301.

Computer system 300 also includes a data storage device 304 ("disk subsystem") such as a magnetic or optical disk and disk drive coupled with the bus 310 for storing information and instructions. Data storage device 304 can include one or more removable magnetic or optical storage media (e.g., diskettes, tapes) which are computer readable memories. Memory units of system 300 include volatile memory 302, non-volatile memory 303 and data storage device 304. In one embodiment, volatile memory 302 is partitioned to comprise a number of distinct, independently operating memory units.

Computer system 300 can further include an optional signal generating device 308 (e.g., a modem, or a network interface card "NIC") coupled to the bus 300 for interfacing with other computer systems. Also included in computer system 300 of FIG. 3 is an optional alphanumeric input device 106 including alphanumeric and function keys coupled to the bus 310 for communicating information and command selections to the central processor 301. Computer system 300 also includes an optional cursor control or directing device 307 coupled to the bus 310 for communicating user input information and command selections to the central processor 301. An optional display device 305 can also be coupled to the bus 310 for displaying information to the computer user. Display device 305 may be a liquid crystal device, other flat panel display, cathode ray tube, or other display device suitable for creating graphic images and alphanumeric characters recognizable to the user. Cursor control device 307 allows the computer user to dynamically signal the two dimensional movement of a visible symbol (cursor) on a display screen of display device 305. Many implementations of cursor control device 307 are known in the art including a trackball, mouse, touch pad, joystick or special keys on alphanumeric input device 306 capable of signaling movement of a given direction or manner of displacement. Alternatively, it will be appreciated that a cursor can be directed and/or activated via input from alphanumeric input device 306 using special keys and key sequence commands.

Figure 4:
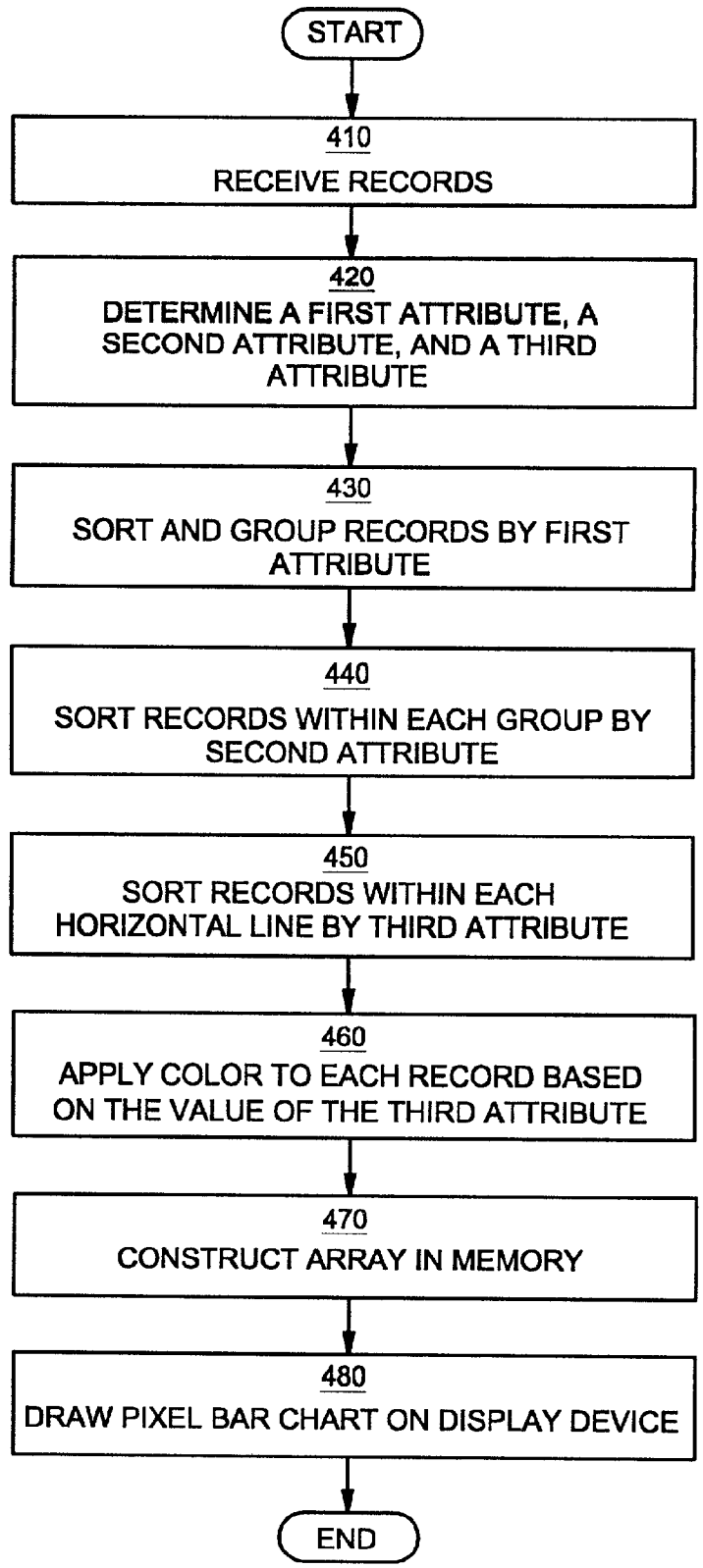
FIG. 4 is a flowchart diagram illustrating steps in a process for graphically presenting large volumes of data in accordance with an embodiment of the present invention.

FIG. 4 is a flowchart diagram illustrating steps in a process 400 for graphically presenting and visually mining large volumes of data having multiple attributes without requiring aggregation of the data, in accordance with an embodiment of the present invention. Steps of process 400, in the present embodiment, may be implemented with any computer languages used by those of ordinary skill in the art. In one embodiment, process 400 is for graphically presenting and visually mining large volumes of data using a graphically displayable array. In one embodiment, the graphically displayable array is a pixel array.

At step 410 of process 400, data comprising a plurality of records is received. Each record comprises a plurality of attributes, wherein each attribute corresponds to a particular piece of information of a record. For example, a consumer electronics business has a record for each order the business handles. In this example, each record may have attributes corresponding to the order number, the price of the order, the customer identification number (ID), and the quantity of items ordered.

At step 420, it is determined which attributes will be selected for inclusion in the construction of a graphically displayable array. In one embodiment, a first attribute of the plurality of attributes is selected, wherein the first attribute corresponds to a horizontal axis of an array. A second attribute of the plurality of attributes is selected, wherein the second attribute corresponds to a vertical axis of the array. A third attribute of the plurality of attributes is selected, wherein the third attribute corresponds to a color.

It should be appreciated that the third attribute is selected from the entire plurality of attributes. In one embodiment, the third attribute is the same attribute as that selected as the first attribute. In another embodiment, the third attribute is the same attribute as that selected as the second attribute.

At step 430, the plurality of records are sorted by the first attribute. The records are then divided into groups by the first attribute, such that records that have the some value for the first attribute constitute a group.

In one embodiment, each record is represented by one unique pixel of a display. Each group has to have at least as many records as the height of the array in pixels. The height of the array is predetermined, based on user inputs. In one embodiment, the height of the array is determined as a function of the number of vertical pixels comprising the display and the total number of records comprising the array. The number of records in each group determines the width of each group of the array. The area of each group is proportional to the number of records in each group.

In another embodiment, each record is represented by a data point of a display, wherein the data point comprises a plurality of pixels. Each group has to have at least as many records as the height of the array in pixels or data points.

Figure 5A:
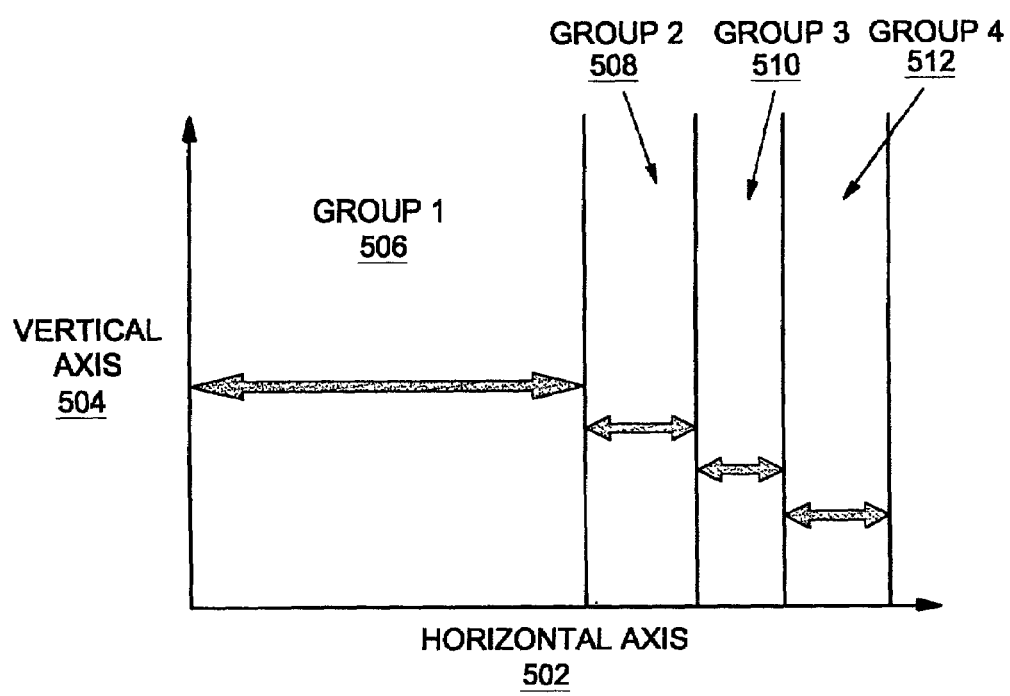
FIG. 5a is a block diagram illustrating the sorting of a plurality of records by a first attribute and dividing the records into groups accordingly in accordance with an embodiment of the present invention.

FIG. 5a is a block diagram 500 illustrating the sorting of a plurality of records by a first attribute and dividing the records into groups accordingly in accordance with an embodiment of the present invention. Diagram 500 illustrates an exemplary array comprising a horizontal axis 502 and a vertical axis 504. Each record is sorted according to the first attribute and divided into groups. Group one 506 consists of records all having the same value for the first attribute. Similarly, group two 508, group three 510 and group four 512 consist of records with identical values of the first attribute, respectively. The arrows indicate the width of each group, respectively.

At step 440, the records are sorted by the second attribute within each group. In one embodiment, the records are sorted from the lowest value of the second attribute to the highest value of the second attribute. The record having the lowest value of the second attribute is placed in the bottom left of each group, and records are placed from left to right, moving up the group, until all records have been placed within the group.

Figure 5B:
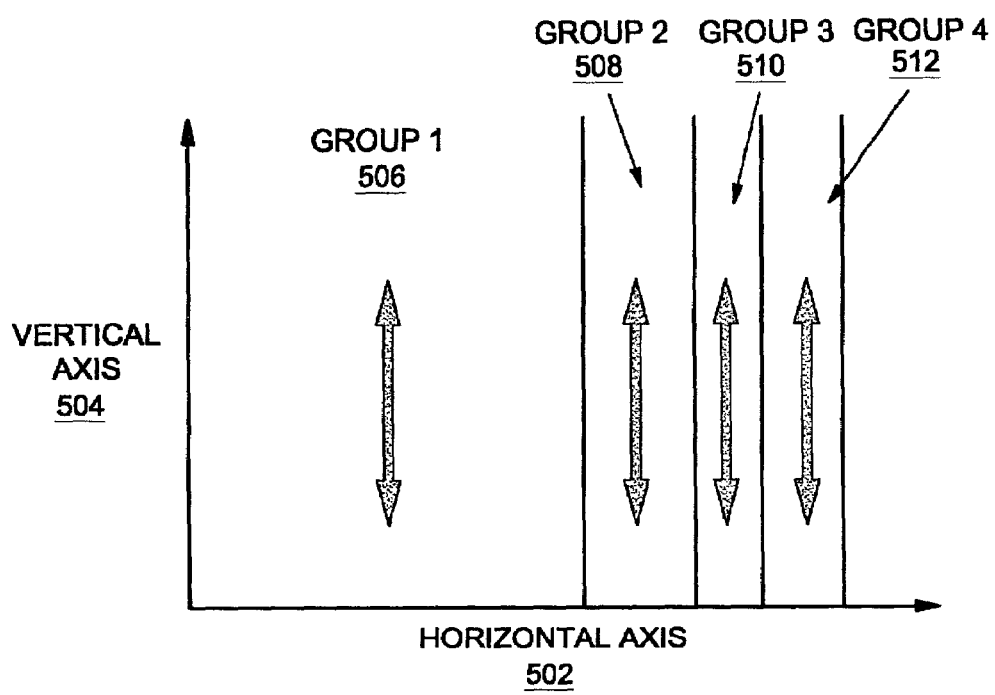
FIG. 5b is a block diagram illustrating the sorting of a plurality of records within a group by a second attribute in accordance with an embodiment of the present invention.

FIG. 5b is a block diagram 520 illustrating the sorting of a plurality of records within a group by a second attribute in accordance with an embodiment of the present invention. Diagram 530 illustrates an exemplary array comprising a horizontal axis 502 and a vertical axis 504. Each record is sorted according to the second attribute and within each group. The arrows indicate the possible orders of sorting the records by the second attribute. In one embodiment, the records are sorted vertically, and ordered in horizontal lines from left to right.

At step 450, the records are sorted by the third attribute within each horizontal line of each group. In one embodiment, each horizontal line is sorted such that the lowest value to the highest value is sorted from left to right within the horizontal line.

Figure 5C:
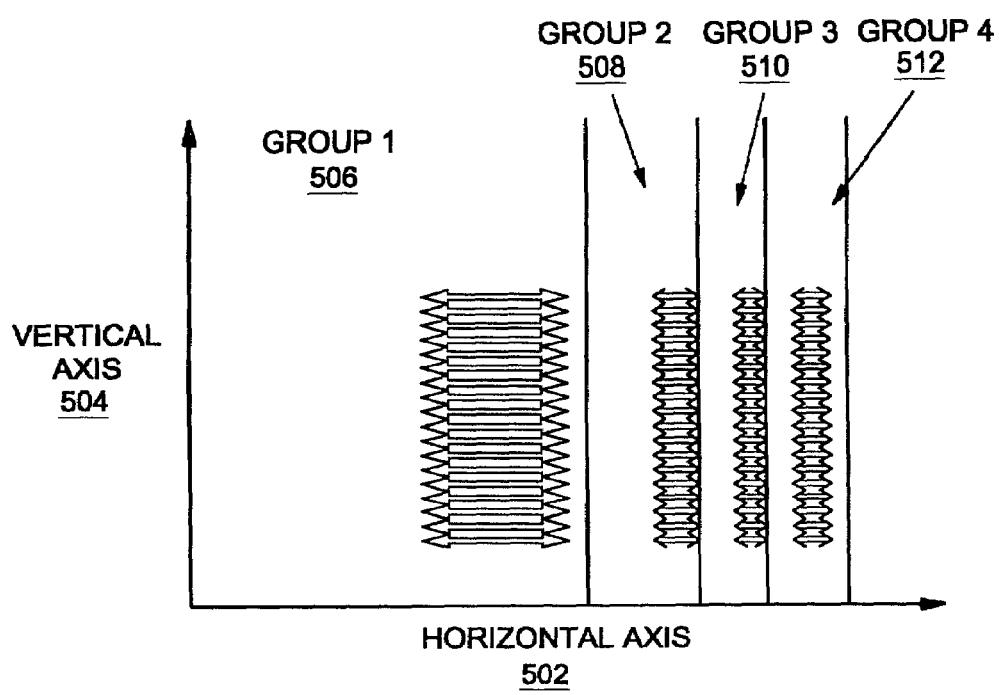
FIG. 5c is a block diagram illustrating the sorting of a plurality of records within a horizontal line of a group by a third attribute in accordance with an embodiment of the present invention.

FIG. 5c is a block diagram 540 illustrating the sorting of a plurality of records within a horizontal line of a group by a third attribute in accordance with an embodiment of the present invention. Diagram 540 illustrates an exemplary array comprising a horizontal axis 502 and a vertical axis 504. Each record is sorted according to the third attribute and within each horizontal line of each group. In one embodiment, the records are ordered in the horizontal lines from left to right. The arrows indicate the possible orders of sorting the horizontal lines.

At step 460, each record is assigned a color corresponding to the value of the third attribute. It should be appreciated that any attribute may be selected as the third attribute for purposes of the present invention. In one embodiment, the color is calculated from the value of the third attribute. In one embodiment, non-linear 256 RGB (red-green-blue) color scale is used for determining the color for each record. In another embodiment, a non-linear gray-scale color scale is used to determine the color for each record. It should be appreciated that any color scale or range, both linear and non-linear, may be used in regard to the present invention.

In one embodiment, the value of the third attribute is normalized to the range 0 to 1. In one preferred embodiment, the normalization is nonlinear. Then the range 0 to 1 is mapped to a color range.

At step 470, a graphically displayable array comprising the previously sorted records (e.g. sorting of steps 430–450) is constructed in the memory (e.g., volatile memory 302 of FIG. 3) of a computer system.

At step 480, the graphically displayable array constructed in step 470 is drawn on a display device (e.g., display device 305 of FIG. 3) of a computer system. In one embodiment, the graphically displayable array is a pixel array (e.g., a pixel bar chart). In the present embodiment, each record is graphically presented in the display device as one pixel. Each record of a group is represented as one pixel. The area of a group represents the number of pixels comprising the group.

In one embodiment, a user may interact with the graphically displayable array by moving a cursor to a pixel or data point to access the information of the represented record. A "drill down" technique allows for the viewing of all related information after selecting a single record. In another embodiment, a user may view all related information for a cluster of pixels or data points by selecting an area of the array with a cursor.

In one embodiment, the attributes used for grouping horizontally, sorting vertically and for coloring can be selected and changed interactively to allow for faster access to more valuable information.

Figure 6B:
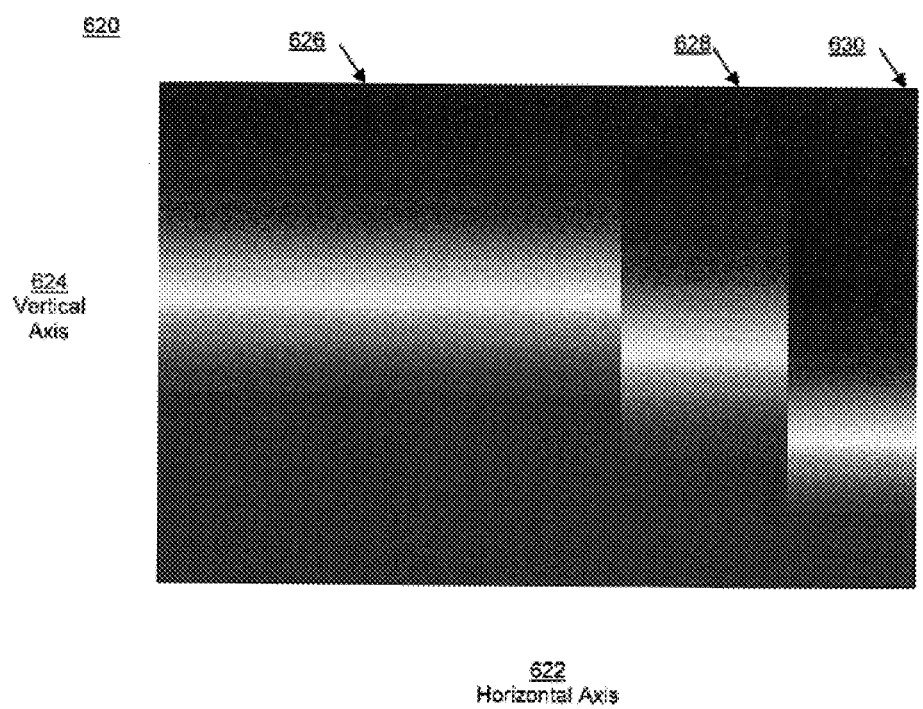
FIG. 6b illustrates a graphically displayable array wherein the third attribute (associated with color) is the same as the second attribute (associated with the vertical axis) in accordance with an embodiment of the present invention.

FIGS. 6a, 6b and 6c illustrate a series of exemplary graphically displayable pixel arrays (e.g., pixel bar charts) wherein the third attribute is varied across each array. FIG. 6a illustrates a graphically displayable pixel array 600 wherein the third attribute is the same as the first attribute in accordance with an embodiment of the present invention. Pixel array 600 comprises horizontal axis 602 and vertical axis 604.

As described above, a plurality of records are first sorted by the first attribute and divided into groups according to the first attribute. In the present embodiment, the third attribute (e.g., the attribute associated with a corresponding color) is the same attribute selected as the first attribute. Color is used to represent the third attribute of a record. The color is calculated from the value of each attribute, and the color is assigned to each record accordingly.

In FIG. 6a, as the third attribute is the same as the first attribute, each group will be comprised of records with the same third attribute. As a result, each record within each group is assigned the same color. In the present embodiment, every record of group 606 is assigned the color red, every record of group 608 is assigned the color orange, every record of group 610 is assigned the color yellow.

FIG. 6b illustrates a graphically displayable pixel array wherein the third attribute is the same as the second attribute in accordance with an embodiment of the present invention. Pixel array 620 comprises horizontal axis 622 and vertical axis 624.

As described above, after the plurality of records are sorted by the first attribute and divided into groups, the records within each group are sorted vertically by the second attribute. In the present embodiment, the third attribute (e.g., the attribute associated with a corresponding color) is the same attribute selected as the second attribute.

In FIG. 6b, as the third attribute is the same as the second attribute, the vertical sorting of the records of each group are represented in color by the third attribute. As the values for the third attribute increase, the color assigned to each record changes to reflect the difference. The records of group 626, in the present embodiment, gradually change in color from red to purple, based on the corresponding value of the third attribute of each record. Similarly, the records of group 628 and 630 also gradually change in color from red to purple.

It should be appreciated that the embodiments discussed above in pixel array 600 of FIG. 6a and pixel array 620 of FIG. 6b are special situations where the third attribute selected is the same attribute as either the first or second attribute. FIG. 6c illustrates a graphically displayable pixel array 640 wherein the third attribute is different than both the first attribute and the second attribute in accordance with an embodiment of the present invention. Pixel array 640 comprises horizontal axis 642 and vertical axis 644.

Each horizontal line of each group (e.g., groups 646, 648, and 650) are sorted by a third attribute. The records of each horizontal line of each group gradually change in color from red to purple as a result of the corresponding value of the third attribute of the record.

In one embodiment of the present invention, a user may interact with the data in a number of ways. In one embodiment, the attributes used for grouping horizontally, sorting vertically and for the coloring (e.g., the first, second and third attributes) can be selected and changed interactively to allow faster identification of valuable information. The user can interactively change any of the attributes of the present pixel bar chart to get a set of new pixel arrays.

In one embodiment, each record comprises more than three attributes. In constructing the series of multiple linked graphically displayable arrays, the first attribute and the second attribute remain the same across all arrays. However, the third attribute can be changed interactively to any of the remaining attributes to allow access to different information.

In one embodiment, a "drill down" technique allows the viewing of all related information after picking a single record. A user interacting with a cursor may select a single record. By selecting a record, the user can view all attributes related to the record.

The non-aggregation information visualization technique of the present invention provides solutions to meet the need of automatic data preparation for the visual data mining of massive data volumes. The present invention retains the simplicity of solutions for viewing small data volumes. Furthermore, the present invention effectively uses screen space to represent each record without cluttering the display, allowing a user to easily discover patterns and correlations. The present invention provides a visual impression by representing the value of a record by a color and representing the number of records by the area of a group. With "drill down" capability, a user can navigate through each record to find detail information. Each record is represented by one pixel, allowing millions of records to be displayed at the same time. Each individual record can be accessed interactively, by allowing direct access to the detail data by picking at single pixels.

The present invention also provides the advantage of representing each record by one pixel allowing millions of records to be displayed at the same time without aggregation (e.g., losing information items).

The preferred embodiment of the present invention, a method for visualizing large volumes of data having multiple attributes without aggregation, is thus described. While the present invention has been described in particular embodiments, it should be appreciated that the present invention should not be construed as limited by such embodiments, but rather construed according to the below claims.

What is claimed is:

1. A computer-implemented method for graphically presenting data, said method comprising:

receiving said data, wherein said data comprises a plurality of records, each record of said plurality of records having a plurality of attributes;

determining a first attribute selected from said plurality of attributes, a second attribute selected from said plurality of attributes and a third attribute selected from said plurality of attributes, wherein said first attribute and said second attribute are different attributes of said plurality of attributes; and arranging said plurality of records to construct a graphically displayable array, said graphically displayable array comprising a plurality of data points, each of said data points visually and non-textually representing one record of said plurality of records wherein said first attribute corresponds to a first axis of a coordinate system, said second attribute corresponds to a second axis of said coordinate system, wherein said second axis is perpendicular to said first axis, and said third attribute corresponds to a color displayed within said graphically displayable array.

2. A computer-implemented method as recited in claim 1 wherein said arranging said plurality of records to construct said graphically displayable array comprises:

sorting said plurality of records according to said first attribute and dividing said plurality of records into groups according to said first attribute;

sorting said records of each of said groups according to said second attribute; and sorting said records of each horizontal line of each of said groups according to said third attribute.

3. A computer-implemented method as recited in claim 1 wherein said third attribute is different than both said first attribute and said second attribute.

4. A computer-implemented method as recited in claim 1 wherein each said data point is represented by a pixel on a display, wherein a location of said pixel is defined by said first attribute corresponding to said first axis and said second attribute corresponding to said second axis.

5. A computer-implemented method as recited in claim 1 wherein said first axis is a horizontal axis.

6. A computer-implemented method as recited in claim 1 wherein said second axis is a vertical axis.

7. A computer-implemented method as recited in claim 1 wherein selection of one said data point allows for accessing said plurality of attributes of a corresponding said record.

8. A computer-implemented method as recited in claim 7 wherein said selection of one said data point is performed by moving a cursor over said data point to access said plurality of attributes of said record.

9. A computer-implemented method as recited in claim 1 wherein selection of a subset of data points allows for accessing said plurality of attributes of said records corresponding to selected said data points.

10. A computer-implemented method as recited in claim 9 wherein said selection of said subset of said data point is performed by moving a cursor over said area to access said plurality of attributes of said record.

11. A computer readable medium as recited in claim 1 wherein said arranging said plurality of records to construct said graphically displayable array comprises:

sorting said plurality of records according to said first attribute and dividing said plurality of records into groups according to said first attribute;

sorting said records of each of said groups according to said second attribute; and sorting said records of each horizontal line of each of said groups according to said third attribute.

12. A computer readable medium as recited in claim 11 wherein said third attribute is different than both said first attribute and said second attribute.

13. A computer readable medium as recited in claim 11 wherein each said data point is represented by a pixel on a display, wherein a location of said pixel is defined by said first attribute corresponding to said first axis and said second attribute corresponding to said second axis.

14. A computer readable medium as recited in claim 11 wherein said first axis is a horizontal axis.

15. A computer readable medium as recited in claim 11 wherein said second axis is a vertical axis.

16. A computer readable medium as recited in claim 11 wherein selection of one said data point allows for accessing said plurality of attributes of a corresponding said record.

17. A computer readable medium as recited in claim 16 wherein said selection of one said data point is performed by moving a cursor over said data point to access said plurality of attributes of said record.

18. A computer readable medium as recited in claim 11 wherein selection of a subset of data points allows for accessing said plurality of attributes of said records corresponding to selected said data points.

19. A computer readable medium as recited in claim 18 wherein said selection of said subset of said data point is performed by moving a cursor over said area to access said plurality of attributes of said record.

20. A computer system comprising:

a bus;

a display device coupled to said bus;

a computer-readable memory coupled to said bus; and a processor coupled to said bus; said processor for executing a method for graphically presenting data, said method comprising:

receiving said data, wherein said data comprises a plurality of records, each record of said plurality of records having a plurality of attributes;

determining a first attribute selected from said plurality of attributes, a second attribute selected from said plurality of attributes and a third attribute selected from said plurality of attributes, wherein said first attribute and said second attribute are different attributes of said plurality of attributes; and arranging said plurality of records to construct a graphically displayable array, said graphically displayable array comprising a plurality of data points, each of said data points visually and non-textually representing one record of said plurality of records wherein said first attribute corresponds to a first axis of a coordinate system, said second attribute corresponds to a second axis of said coordinate system, wherein said second axis is perpendicular to said first axis, and said third attribute corresponds to a color displayed within said graphically displayable array.

21. A computer system as recited in claim 20 wherein said arranging said plurality of records to construct said graphically displayable array comprises:

sorting said plurality of records according to said first attribute and dividing said plurality of records into groups according to said first attribute;

sorting said records of each of said groups according to said second attribute; and sorting said records of each horizontal line of each of said groups according to said third attribute.

22. A computer system as recited in claim 20 wherein said third attribute is different than both said first attribute and said second attribute.

23. A computer system as recited in claim 20 wherein each said data point is represented by a pixel on a display, wherein a location of said pixel is defined by said first attribute corresponding to said first axis and said second attribute corresponding to said second axis.

24. A computer system as recited in claim 20 wherein said first axis is a horizontal axis.

25. A computer system as recited in claim 20 wherein said second axis is a vertical axis.

26. A computer system as recited in claim 20 wherein selection of one said data point allows for accessing said plurality of attributes of a corresponding said record.

27. A computer system as recited in claim 26 wherein said selection of one said data point is performed by moving a cursor over said data point to access said plurality of attributes of said record.

28. A computer system as recited in claim 20 wherein selection of a subset of data points allows for accessing said plurality of attributes of said records corresponding to selected said data points.

29. A computer system as recited in claim 28 wherein said selection of said subset of said data point is performed by moving a cursor over said area to access said plurality of attributes of said record.

30. A computer readable medium having a computer-readable program code embodied therein for causing a computer system to perform a method comprising:
receiving data, wherein said data comprises a plurality of records, each record of said plurality of records having a plurality of attributes;
determining a first attribute selected from said plurality of attributes, a second attribute selected from said plurality of attributes and a third attribute selected from said plurality of attributes, wherein said first attribute and said second attribute are different attributes of said plurality of attributes;
arranging said plurality of records to construct a graphically displayable array, said graphically displayable array comprising a plurality of data points, each of said data points visually and non-textually representing one record of said plurality of records wherein said first attribute corresponds to a first axis of a coordinate system, said second attribute corresponds to a second axis of said coordinate system, wherein said second axis is perpendicular to said first axis, and said third attribute corresponds to a color displayed within said graphically displayable array.

* * * * *